(12) United States Patent
Kirilenko et al.

(10) Patent No.: US 10,525,875 B2
(45) Date of Patent: Jan. 7, 2020

(54) DEVICE FOR DISPLAYING AT LEAST ONE SYMBOL AND METHOD FOR PRODUCING A DEVICE FOR DISPLAYING AT LEAST ONE SYMBOL

(71) Applicant: ZF Friedrichshafen AG, Friedrichshafen (DE)

(72) Inventors: Alexander Kirilenko, Diepholz (DE); Karsten Strassburg, Hannover (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 112 days.

(21) Appl. No.: 15/036,153

(22) PCT Filed: Oct. 14, 2014

(86) PCT No.: PCT/EP2014/071935
§ 371 (c)(1),
(2) Date: May 12, 2016

(87) PCT Pub. No.: WO2015/071036
PCT Pub. Date: May 21, 2015

(65) Prior Publication Data
US 2016/0288704 A1    Oct. 6, 2016

(30) Foreign Application Priority Data
Nov. 14, 2013   (DE) .......................... 10 2013 223 244

(51) Int. Cl.
*B60Q 3/62*    (2017.01)
*F16H 63/42*   (2006.01)
*B60Q 3/14*    (2017.01)

(52) U.S. Cl.
CPC ................. *B60Q 3/62* (2017.02); *B60Q 3/14* (2017.02); *F16H 63/42* (2013.01)

(58) Field of Classification Search
CPC .. B60Q 3/14; B60Q 3/62; F16H 63/42; B60K 35/00
See application file for complete search history.

(56) References Cited

U.S. PATENT DOCUMENTS 6,871,434 B2    3/2005  Sunaga et al.
7,441,913 B2 *  10/2008 Bayersdorfer ...... F16H 59/0278
                                                362/23.11
(Continued)

FOREIGN PATENT DOCUMENTS

DE      19654418 A1     6/1998
DE      10250675 A1     5/2004
DE    102004009208 A1   9/2005

OTHER PUBLICATIONS

German Office Action dated Jul. 10, 2014 for German Patent Application No. DE 10 2013 223 244.6 (German language), 7 pages.

(Continued)

*Primary Examiner* — Anh T Mai
*Assistant Examiner* — Nathaniel J Lee
(74) *Attorney, Agent, or Firm* — Brinks Gilson & Lione (57) ABSTRACT

A device for a vehicle for displaying at least one symbol has a translucent plastic layer with a non-translucent coating, wherein a symbol face for a symbol to be displayed by the device is recessed from the non-translucent coating. Furthermore, the device has a non-translucent intermediate component, which is applied outside the symbol face and surrounding the symbol face on the non-translucent coating and which forms a light shaft adjoining the symbol face. Furthermore, the device has a diffuser element, which is arranged and designed inside the light shaft and spaced apart from the symbol face by a gap in order to convert light penetrating the diffuser element to diffuse light for illuminating the symbol face.

2 Claims, 3 Drawing Sheets

(56) References Cited

U.S. PATENT DOCUMENTS

| | | | |
|---|---|---|---|
| 2008/0203755 A1 | 8/2008 | Bourgeois-Jacquet et al. | |
| 2009/0286072 A1* | 11/2009 | Kuchler | B60K 37/06 428/336 |
| 2011/0056815 A1* | 3/2011 | Lust | C23C 14/042 200/314 |
| 2012/0200475 A1* | 8/2012 | Baker | G09F 13/04 345/4 |
| 2013/0258643 A1* | 10/2013 | Helstern | G09F 13/04 362/97.1 |

OTHER PUBLICATIONS

English translation of p. 7 of German Office Action dated Jul. 14, 2014 for German Patent Application No. DE 10 2013 223 244.6 (2 pages).

International Search Report and Written Opinion dated Feb. 18, 2015 for PCT/EP2014/071935 (German language, 9 pages).

International Search Report dated Feb. 18, 2015 for PCT/EP2014/071935 (English language, 2 pages).

\* cited by examiner

DEVICE FOR DISPLAYING AT LEAST ONE SYMBOL AND METHOD FOR PRODUCING A DEVICE FOR DISPLAYING AT LEAST ONE SYMBOL

RELATED APPLICATIONS

This application is a filing under 35 U.S.C. § 371 of International Patent Application PCT/EP2014/071935, filed on Oct. 14, 2014, and claims the priority of German Patent Application DE 10 2013 223 244.6, filed on Nov. 14, 2013, both of which are incorporated by reference herein in their entirety.

BACKGROUND

1. Technical Field

The present invention relates to a device for a vehicle for displaying at least one symbol, a switching device for switching a vehicle transmission, and a method for producing a device for a vehicle for displaying at least one symbol.

2. Background Information

For example, a display device can be used in a vehicle to show a driver the current operating mode by means of an illuminated symbol.

DE 10 2004 009 208 A1 describes a respective lighting system for displays in vehicles.

BRIEF SUMMARY

Against this background, the present invention provides an improved device for displaying at least one symbol, a switching device for switching a vehicle transmission, a method for producing a device for a vehicle for displaying at least one symbol, and a method for displaying at least one symbol according to the main claims. Advantageous embodiments are included in the sub-claims and the subsequent description.

A symbol to be displayed by a device can be shown by illuminating a symbol face with diffuse light. The diffuse light can be provided by means of background illumination using a diffuser element. To avoid undesired light effects, it I possible to possible to provide a gap between the symbol face and the diffuser element. According to one embodiment, the diffuser element can be designed in such a way that the symbol is visible to the viewer even when the background illumination is switched off.

A device for a vehicle for displaying at least one symbol has the following characteristics: a translucent plastic layer with a non-translucent coating, wherein a symbol face for a symbol to be displayed by the device is recessed from the non-translucent coating; a non-translucent intermediate component, which is applied on the non-translucent coating outside of the symbol face and surrounding the symbol face, and which forms a light shaft adjoining the symbol face; and a diffuser element, which is arranged and designed inside the light shaft and spaced apart from the symbol face through a gap so as to convert light penetrating the diffuser element to diffuse light for illuminating the symbol face.

For example, the device can be used for a gear knob for a switching device for a transmission for a vehicle. The device can be used for displaying one or multiple symbols. For example, a symbol can involve a number, a letter or a pictogram. When operating the device, such a symbol can be illuminated by means of background illumination. The translucent plastic layer can be colorless. The translucent plastic layer can consist of one or multiple layers. The translucent plastic layer can comprise a hard surface or a coating to form a depth effect. The plastic layer can for an outer surface of the device, thus being exposed to environmental influences. For example, the non-translucent coating can consist of a black or dark color coat applied to the plastic layer. The symbol face can correspond to a surface of the symbol to be displayed by the device. In the region of the symbol face the non-translucent coating of the plastic layer can have been removed. Alternatively, the symbol face can have been recessed when applying the non-translucent coating on the plastic layer. Therefore, the symbol face can depict an area of the plastic layer which is not covered by the non-translucent coating. The non-translucent intermediate component can be designed to prevent overexposure effects. Furthermore, the intermediate components can be designed to stabilize the plastic layer. The light shaft can be designed in the form of a cylindrical space, which is closed on one side by the plastic layer. The diffuser element can consist of a plastic element. A surface of the diffuser element facing the plastic layer can be separated by means of the gap from the non-translucent coating and in the region of the symbol face from the plastic layer. For example, a thickness of the gap can be smaller than one-tenth of a thickness of the diffuser element. The light penetrating the diffuser element can be generated by an illuminant, for example, a light-emitting diode. The penetrating light can be coupled into the diffuser element from a side facing away from the plastic layer, diffused, for example, dispersed, by a material structure of the diffuser element, and coupled out of a surface of the diffuser element facing the plastic layer as diffused light, coupled into the gap and from the gap into the symbol face. For example, the diffuser element can comprise diffuser particles for converting the penetrating light into diffuse light.

The gap between the diffuser element and the symbol face can be filled with media, which prevents light reflected inside the translucent plastic layer from passing into the gap. For example, the medium can consist of gas or a vacuum. In this way, it can be avoided that light beams spreading inside the plastic layer impact the diffuser element, resulting in undesired light effects at the symbol face.

For example, the gap can be filled with air. This could be implemented cost-effectively.

The diffuser element can comprise coloring agents. By means of the coloring agents, it is possible to set a light color of the diffuse light reflected by the diffuser element. The light color can represent a light in which a viewer of the device can see the symbol. As a result, it is possible to use a colorless plastic film without requiring a colored intermediate layer between the diffuser element and the symbol face.

The translucent plastic layer can be produced from a synthetic polymer or a thermoplastic material. Such a plastic film is also suitable for implementing curved symbol faces. The plastic layer can consist of a procured or cured lacquer coat in the form of a hard surface. Such a lacquer coat can be very thin, having a high scratch resistance.

The non-translucent coating can consist of a dark, for example, black lacquer coat, which is applied to the plastic layer. By means of such a lacquer coat, it can be reliably avoided that light is radiated outside the symbol face.

The diffuser element can be designed as an element that is inserted as a whole into the light shaft. For example, the diffuser element can comprise a small block consisting, for example, of injection-molded plastic material, which is snapped or pressed onto the plastic layer or the non-translucent coating of the plastic layer. For example, such an element can be attached in the light shaft by means of a form-fit or frictional connection. Such a connection can be easily produced.

Alternatively, the diffuser element can be designed in the form of an element which is produced from material applied to the symbol face in the light shaft. At the same time, the material can have a characteristic which when curing the material results in a durable bond of the material on the intermediate component and when forming the gap to a decreasing bond on the symbol face. In this way, the diffuser element can be firmly bonded in the light shaft. In addition, the gap can have an extremely narrow design.

The device can comprise an illuminant for radiating the light penetrating the diffuser element. The illuminant can be arranged on a side of the diffuser element facing away from the plastic layer. The illuminant can be designed to radiate the light in a spectral range visible for humans. The light can involve white light or light having a color different from white. The illuminant can be arranged in the light shaft or an opening opposite of the light shaft.

According to one embodiment of the device, a further symbol face can be recessed from the non-translucent coating for an additional symbol to be displayed. The non-translucent intermediate component can be applied outside of the further symbol face and surrounding the further symbol face on the non-translucent coating and form a further light shaft adjoining the further symbol face. A further diffuser element can be arranged inside the further light shaft and designed to be spaced apart from the further symbol face by means of a further gap so as to convert light penetrating the further diffuser element in diffuse light for illuminating the further symbol face. The light shaft and the further light shaft can be adjoining one another and separated by a wall formed by the intermediate component. In this way, it is possible to display two adjacent symbols. This approach can be extended respectively to additional symbols.

For example, the device can be used in connection with a switching device of a vehicle for shifting a vehicle transmission. A respective switching device for shifting a vehicle transmission can have a respective device, for example for displaying a set operating mode of the vehicle transmission. The device can be implemented with a low overall thickness, this being especially suitable for use with a switching device.

A method for producing a device for a vehicle for displaying a symbol comprises the following steps: providing an arrangement consisting of a translucent plastic layer with a non-translucent coating, wherein a symbol face for a symbol to be displayed by the device is recessed from the non-translucent coating, as well as a non-translucent intermediate component is arranged outside of the symbol face and surrounding the symbol face on the non-translucent coating and forms a light shaft adjoining the symbol face; and arranging a diffuser element inside the light shaft and spaced apart by a gap from the symbol face, wherein the diffuser element is designed to convert light penetrating the diffuser element to diffuse light for illuminating the symbol face.

The step of arranging can be performed in different ways, for example, depending on whether the diffuser element is inserted in the light shaft in the form of a prefabricated component or whether it is shaped inside the light shaft.

For example, in the step of arranging, material for forming the diffuser element can be sputtered on the symbol face in the light shaft, wherein the material has a characteristic which when curing the material results in a durable bond of the material on the intermediate component and when forming the gap to a decreasing bond on the symbol face.

A method for displaying at least one symbol comprises the following steps: converting light penetrating a diffuser element arranged in a light shaft to diffuse light; and conducting the diffuse light through a gap on a symbol face, which is recessed from a non-translucent coating of a translucent plastic layer in order to display the symbol.

For example, the steps of the method can be performed using features of an above-mentioned device.

BRIEF DESCRIPTION OF THE DRAWINGS

The invention is described in more detail in an exemplary manner by means of the enclosed drawings. It is shown.

DETAILED DESCRIPTION OF THE DRAWINGS AND THE PRESENTLY PREFERRED EMBODIMENTS

In the subsequent description of preferred embodiments of the present invention the same or similar reference numerals are used for the elements shown in the different figures and acting similarly, wherein it has been decided not to repeat the description of these elements.

Figure 1:
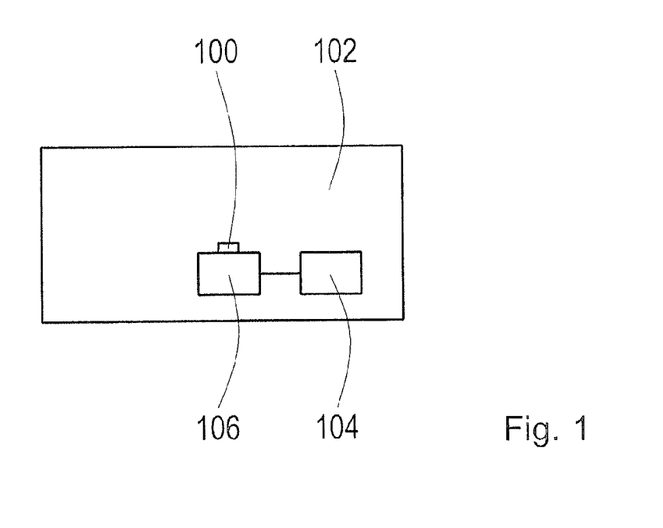
FIG. 1 a diagram of a vehicle with a device for displaying at least one symbol.

FIG. 1 shows a diagram of a device 100 for displaying at least one symbol according to an embodiment of the present invention. In an exemplary manner, the device 100 is arranged in a vehicle 102, for example, a passenger car. The vehicle 102 has a transmission 104 and a switching device 106 for shifting the transmission 104. Via the switching device 106, a driver of the vehicle 102 is able to set different operating modes, for example, different gears or different operating modes of the transmission 104 or the vehicle 102. The device 100 is designed to display the adjustable operating modes to the driver by means of symbols. For example, for this purpose, the device 100 can be arranged at a gearshift lever of the switching device 106. For example, to set an operating mode, the driver is able to lead the gearshift lever into a shifting gate assigned to the operating mode.

According to one embodiment, the device 100 is designed in the form of a multi-component display. The device 100 can be used as a component that can be illuminated, for example, in a circuit in the gear knob in order to display the engaged shifting gate (P, R, N, D/S, +, −, etc.).

The device 100 can be used also in connection with different components of a vehicle 102. In addition, the device 100 can be used also for applications outside of the vehicle sector, for example, in building technology.

Figure 2:
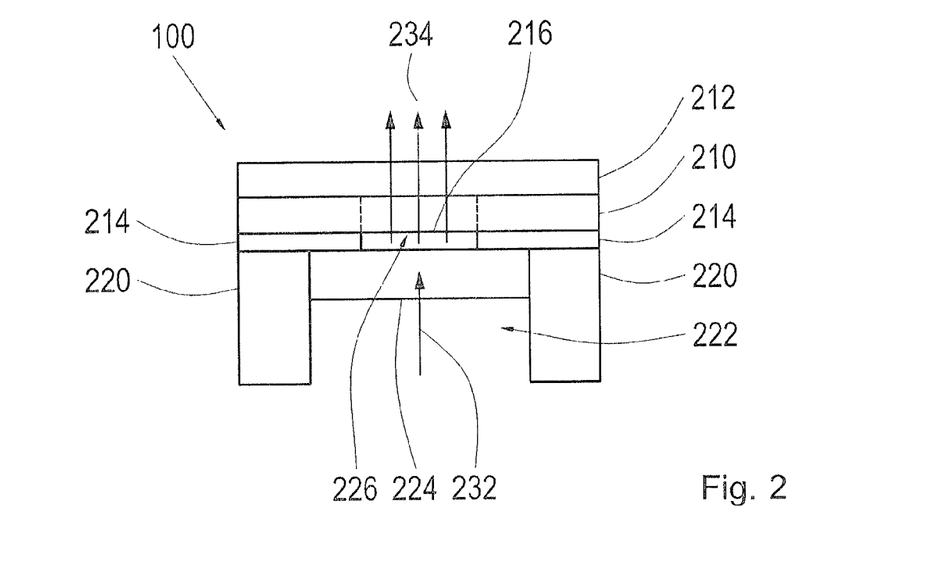
FIG. 2 a diagram of device for displaying at least one symbol.

FIG. 2 shows a diagram of a device 100 for displaying at least one symbol according to an embodiment of the present invention. The device 100 is shown in a cross-section diagram. The device 100 is designed to display a symbol. The device 100 can be extended to display multiple symbols, for example, multiple symbols for displaying different shifting gates of a circuit, as described in FIG. 1.

The device 100 has a translucent plastic layer 210. Optionally, the plastic layer 210 has on one side, which represents a surface of the device 100 that is visible to the viewer of the device 100, a hard surface 212 by means of which the device 100 can be protected against damages, for example, scratches. The hard surface 212 can have a thickness which results in a depth effect of the symbol to be shown. On the rear side, i.e., a side facing away from the viewer, the plastic layer 210 has a non-translucent coating 214. The non-translucent coating 214 does not cover the entire surface but has a recess in the region of a symbol face 216 of the plastic layer 210. The symbol face 216 defines a symbol to be displayed by the deice 100. According to this embodiment, the plastic layer 210 and thus the symbol face 216 are colorless and transparent.

A non-translucent intermediate component 220 has been applied to the non-translucent coating 214. At the same time, the intermediate component 220 has been arranged outside of the symbol face 216 and is surrounding the symbol face 216 in circular manner. In this way, a light shaft 222 adjoining the symbol face 216 is provided by means of a circumferential wall of the intermediate component 220. The light shaft 22 can be designed in the form of a cylinder. The walls of the intermediate component 220 forming the light shaft 222 can be aligned in cross direction to the plastic layer 210. The longitudinal extension axis of the light shaft 222 can be aligned vertically to the symbol face 216. Inside the light shaft 222, a diffuser element 224 has been arranged. According to this embodiment, the diffuser element 224 is in direct contact with an adjacent surface of the non-translucent coating 214. However, it is separated from the symbol face 216 of the plastic layer 210 through a gap 226. According to an alternative embodiment, the gap 226 extends between the diffuser element 224 and the non-translucent coating 214.

As a result, the gap 22 is located between the diffuser element 224, as well as the non-translucent coating 214 and the symbol face 216. For example, the gap 226 can be designed in the form of an air gap, which is completely filled with air. In particular, there can be no colored layer between the diffuser element 224 and the illuminated area 216.

According to this embodiment, the diffuser element 224 extends completely between the walls of the intermediate component 220 forming the light shaft 222 and is adjoining these walls. According to this embodiment, the diffuser element 224 does not completely fill the light shaft 222 in longitudinal direction.

Light 232 impacting the diffuser element 224 from a side of the diffuser element 224 that is opposite of the plastic layer 210 is coupled into the diffuser element 224, dispersed or expanded by the diffuser element 224. At least art of the light 232 is coupled out of the diffuser element 224 in the direction of the symbol face 216 as diffuse light 234, in order to be radiated by the device 100 through the gap 226, as well as the symbol face 216, for displaying the symbol. The light 232 can be provided by a suitable illuminant. Such an illuminant can be part of the device 100 or provided separately.

By means of the diffuse light 234, the symbol face 216 can be illuminated in a light-operating mode of the device 100, so that for a viewer of the device 100 the symbol face 216 appears to be a self-illuminating surface representing the symbol.

In a further operating mode of the device 100, no light 232 can be conducted through the diffuser element 224 on the symbol face 216. In this case, the symbol face 216 can appear as a surface representing the symbol because of ambient light. At the same time, the symbol can appear to the viewer in a color predetermined by the diffuser element 224.

According to one embodiment, the diffuser element 224 has coloring agents which are designed in such a way that the symbol face 216 appears to the viewer to be colored. The colored appearance of the symbol face 216 can be visible to a viewer when the symbol face 216 is illuminated with light 232 through the diffuser element 224 or when the symbol face 216 is illuminated through ambient light. In this way, the diffuser element 224 is visible to the viewer through the plastic layer 210.

The non-translucent coating 214 can be performed in the form of a non-translucent lacquer coat. For example, the non-translucent coating 214 can consist of a dark, or black, lacquer coat.

According to one embodiment, the intermediate component 220, as well as the diffuser element 224, is produced with material sputtered on the non-translucent coating 214. Alternatively, the diffuser element 224 can represent an element inserted and attached in the light shaft 222. For this purpose, it is possible to provide a suitable mounting device at the diffuser element 224 or the light shaft 222.

A surface of the diffuser element 224 facing away from the plastic player 210 can have a planar or structured design. For example, a structured surface can have a curvature or bulge in the direction of the source of light 232. By means of such a structure, a conversion of the light 232 in diffuse light 234 can be intensified. For a conversion of light 232 in diffuse light 234, the diffuser element 224 can have diffuser particles or diffuser pigments.

A display device 100 produced in accordance with the described approach allows for a prevention of overexposure with permanently represented, for example, white symbols in display modules or displays with glass optics or depth effect.

Figure 3:
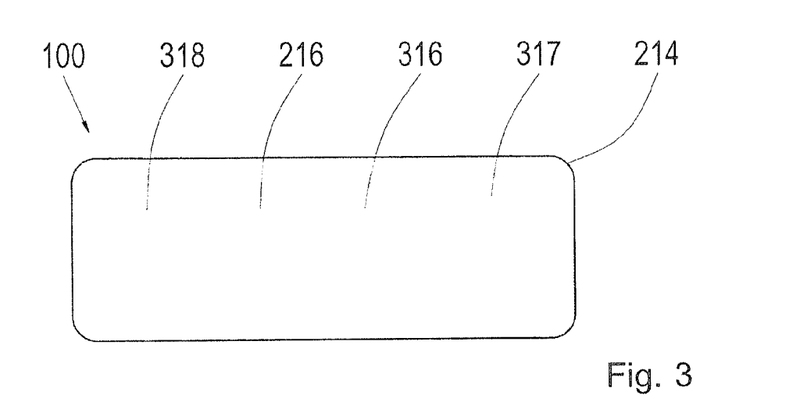
FIG. 3 a top view on a device for displaying at least one symbol.

FIG. 3 shows a top view on a device 100 for displaying at least one symbol according to an embodiment of the present invention. A surface of the device 100 that is visible to the viewer of the device 100 has a basically rectangular form with rounded edges. The device 100 is shown in a condition without background illumination.

The device 100 has four symbols to be displayed which are formed by a symbol face 216 for representing a symbol "R", a symbol face 316 for representing a symbol "N", a symbol face 317 for representing a symbol "D" and a symbol face 318 for representing a symbol "P".

For the viewer, the non-translucent coating 214 of the device 100 can be perceived as a dark, here black, surface. The symbol faces 216, 316, 317, 318 are excluded from the non-translucent coating 214. Through the recesses of the non-translucent coating 214 forming the symbol faces 216, 316, 317, 318, the light, here white, diffuser elements can be perceived among the symbol faces 216, 316, 317.

All symbols, for example, P, R, N, D can have basic illumination. When a gear is engaged, this action is made visible through a much lighter illumination of an LED (spotlighting).

Figure 4:
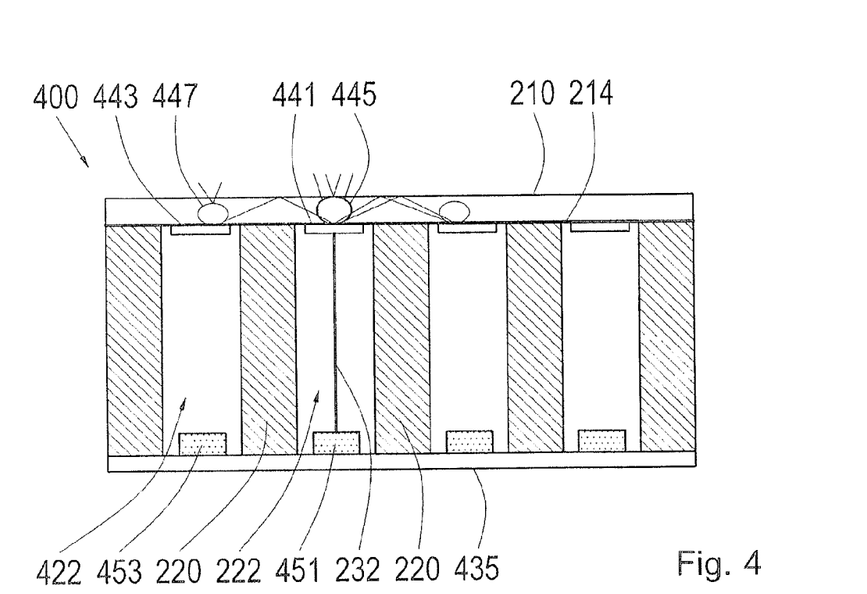
FIG. 4 a diagram of a device for displaying at least one symbol.

FIG. 4 shows a diagram of a device 400 for displaying at least one symbol. The device 400 shown is designed for displaying four symbols.

The device 400 has a translucent plastic layer 210, which has a non-translucent coating 214 on its underside, and which has recesses in the region of the symbol faces for displaying the symbols. On a surface of the non-translucent coating 214 facing away from the plastic layer 210, a non-translucent intermediate component 220 has been applied. For the purpose of forming here four light shafts 222, 422 (in which only the two light shafts shown on the left side are provided with reference numerals), the intermediate component 220 has one recess, respectively, in the region of the symbol faces. The intermediate component 220 is arranged between the non-translucent coating 214 and a conductor board 435 of the device 400. Each symbol face is covered by a color coat 441, 443. A specific illuminant 451, 453 is arranged in each light shaft 222, 422. The illuminants 451, 453 are arranged on the conductor board 435.

The illuminant 451 arranged in the light shaft 222 is shown in operation. The illuminant 451 is designed for radiating light 232. The light 232 impacts the color coat 441 and generates radiation characteristics 445 inside the plastic layer for displaying a symbol. Part of the light 232 transferred from the color coat 441 to the plastic layer 210 is reflected on the outer surface of the plastic layer 210 and impacts, for example, the adjacent color coat 443 of light shaft 422 arranged adjoining light shaft 222, whereby undesired radiation characteristics 447 are generated, which are produced by the illuminant 451 of light shaft 222 and not by the illuminant 453 of light shaft 422.

According to one embodiment, the plastic layer 210 is produced from polymethyl methacrylate (PMMA) or polycarbonate (PC). For example, it can involve a Makrofol® film.

The color coats can be designed as white finishes.

The conductor board 435 can be designed to function as a conductor board 435 having light-emitting diodes as illuminants 451, 453.

In display and symbol insert applications with "depth effect", in which the symbols to be displayed are shown below a PMMA/PC layer of mostly approximately 0.25 mm, an approximately 0.25 mm PC film is first painted black, the desired symbols are lasered out and then the symbol faces representing the symbols are painted white. Then the film is deformed and recoated with a PMMA for glass optics or depth effect. Then each individual symbol has a spotlight or basic illumination.

When a symbol face with spotlight illumination is displayed, the higher illumination can overexpose the adjoining white symbols. This is indicated by the display or symbol insert. When the light impacts the white-coated symbol, the light beams are remitted in a large angle of radiation (Lambertian radiation pattern) to the above PMMA or PC 210. Because of the total internal reflection, the light inside the "glass layer" 210 can reach the adjoining symbols. When these already weakened light beams impact the adjoining white symbols, these symbols are reflected back in almost Lambertian manner because of the physical properties of the white finish and increase in these regions the basic illumination, as shown in FIG. 4.

Figure 5:
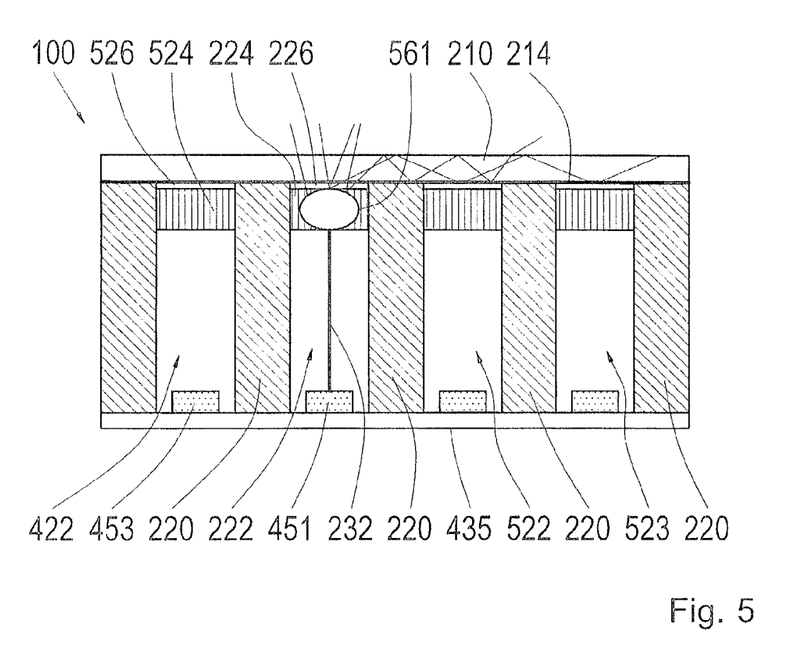
FIG. 5 a diagram of a device for displaying at least one symbol.

FIG. 5 shows a diagram of a device 100 for displaying at least one symbol according to an embodiment of the present invention. This can involve the device 100 shown in FIG. 3. A structure of the device 100 basically corresponds to the structure of the device 100 described in the context of FIG. 2, wherein the device 100 shown in FIG. 5 has four symbol faces for displaying four symbols.

The device 100 has a translucent plastic layer 210, which has a non-translucent coating 214 on its underside, which has recesses in the region of the symbol faces for displaying the symbols. On a surface of the non-translucent coating 214 facing away from the plastic layer 210 a non-translucent intermediate component 220 has been applied. In order to form here four light shafts 222, 422, 522, 523, the intermediate component 220 comprises in the region of the symbol faces one recess, respectively. The intermediate component 220 is arranged between the non-translucent coating 214 and a conductor board 435 of the device 100. One diffuser element 224, 524, respectively, is arranged in each light shaft 222, 422, 522, 523, wherein merely the diffuser elements 224, 524 of the two light shafts 222, 422 depicted on the left are provided with reference numerals. One gap 226, 526, respectively, is arranged between the diffuser elements 224, 524 and the plastic layer 210.

To implement a depth effect, the plastic layer 210 can comprise a plastic film, which has a synthetic layer with a depth-effect-producing thickness on a side facing away from the non-translucent coating 214.

One illuminant 451, 453, respectively, is arranged in the light shafts 222, 422, 522, 523, wherein merely the illuminants 451, 453 of the light shafts 222, 422 depicted on the left are provided with reference numerals. The illuminants 451, 453 are arranged on the conductor board 435.

The illuminant 451 arranged in light shaft 222 is shown in operation. Illuminant 451 is designed to radiate light 232. The light 232 impacts the diffuser element 224 and generates inside the diffuser element 224 a radiation pattern 561 of diffuse light, which via the gap 224 and the symbol face adjoining the gap 224 appears to a viewer of the device 100 through the plastic layer 210 as a symbol.

Light which is transmitted via the gap 224 to the plastic layer 210 and reflected inside the plastic layer 210, is because of the gap 226, 526 between the plastic layer 210 and the diffuser elements 224, 524 not able to form any additional radiation patterns in further diffuser elements 224, 524. For example, in this way, it can be avoided that the light 232 of the illuminant 451 of the light shaft 222 is transmitted to the diffuser element 524 of the adjoining light shaft 422 and becomes visible to the viewer of the device via a symbol face opposite the diffuser element 524.

According to one embodiment, the plastic layer 210 is produced from polymethyl methacrylate (PMMA) or polycarbonate (PC). For example, it can involve a Makrofol® film. Instead of the plastic layer 210, it is also possible to use a compound of a PMMA or PC film, for example, a Makrofol® film and an overlying layer consisting of PMMA or PC, thus forming an outer surface of the device 100.

Each gap 226, 526 can be designed in the form of an air gap.

The diffuser elements 224, 524 can be designed in the form of diffusers having one color, respectively, for example, in the form of white diffusers.

The illuminants 451, 453 can be designed in the form of light-emitting diodes (LEDs). Therefore, the conductor board 435 can involve a conductor board 435 with light-emitting diodes 451, 453.

For example, the device 100 shown can be used for displaying engaged gear selection steps (P, R, N, D, etc.), for example, at a gearshift lever.

To avoid that by means of a total internal reflection the light coupled in the plastic layer through the diffuser element 224 and the gap 226 reaches an adjoining diffuser element 524, for example, for representing a white symbol, according to one embodiment, a respective gap 226, 526, here an air gap, is arranged between the colored, for example, white material of the diffuser elements 224, 524 and the translucent material (PC/PMMA) of the plastic layer 210. As a result, the light directed by total reflection is transmitted and not reflected in Lambertian manner at the colored material of the diffuser elements 224, 524 in the direction of the viewer.

For implementation, the lasered out region of the symbol face is not painted. Instead, here a new material is added, in contrast to the device shown in FIG. 4. In order to still ensure a permanent display, for example, with a white symbol, i.e., even when the background illumination with the illuminants 451, 453 has been turned off, a white material is used here for the coloring of the symbols. It is possible to use in the region of the symbols a white Makrolon® formed into a small block and snapped, pressed, etc. onto the symbol faces is resting as closely as possible at the layer 210 of the film sprayed with PMMA/PC, in order to ensure a permanent display. Because of the fact that the material is not connected with the film of the layer 210, as in the case of the paint finish, there is now an air gap 226, 526 between the two materials. This results in total reflection of the light beams at the lasered out symbols, wherein the light beams are reflected all the way to the outer region of the display or the symbol insert or the like and are therefore not visibly lost, as shown in FIG. 5.

The overexposure from symbol to symbol is thus largely eliminated or not visible and hardly measurable.

Alternatively, it is possible, by means of an assembly injection molding process, to back-mold the white component, here the diffuser elements 224, 524. Through skillful selection of the material, the white component in the form of the diffuser element 224, 524, for example, consisting of PC/PMMA, adheres to the substrate, for example, ABS (acrylonitrile butadiene styrene) of the intermediate element 220. Furthermore, through the shrinkage, the bond at the film to be screened, consisting, for example, of PMMA/PC, is eliminated in the region of the symbol faces. As a result, an air gap 226, 526 is produced which, as described above, contributes to the total reflection of the light.

Material combinations for forming the gap 226, 526 and producing a secure attachment of the diffuser elements 224, 524 in the light shaft 222, 422, 522, 523, it is possible to use a first component, for example, materials such as ABS/PS (PS= polystyrene), PA6, PA6.6 (polyamide) or PC and as second component PMMA. The combination consisting of ABS and PMMA results in an excellent bond. The combination of the remaining materials with PMMA does not result in a bond.

By means of the described approach, it can be avoided that in the event of a spotlight and basic illumination of the same color the basic illumination of the basically illuminated symbols becomes inhomogeneous through overexposure of a spotlight illumination of a symbol. It can also be avoided that in the event of a spotlight and basic illumination of different colors the overexposure results in a clearly visible color distortion of the basically illuminated symbols.

Figure 6:
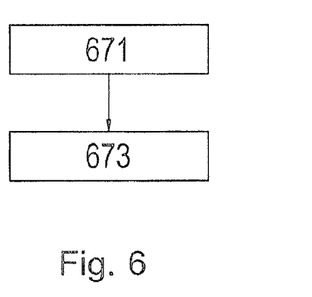
FIG. 6 a flow chart of a method for producing a device.

FIG. 6 shows a flow chart of a method for producing a device for displaying at least one symbol according to an embodiment of the present invention. For example, by using the method, it is possible to produce a device of the type described by means of the preceding figures.

In step 671, an arrangement of a translucent plastic layer with a non-translucent coating and a non-translucent intermediate component is provided. At the same time, at least one symbol face for at least one symbol to be displayed by the device is recessed from the non-translucent coating. The intermediate component is arranged outside of the at least one symbol face and the at least one symbol face is surrounding the non-translucent coating and forms at least one light shaft adjoining the at least one symbol face.

In step 673, a diffuser element is arranged in the light shaft, or a respective diffuser element in each of the light shafts, wherein a gap remains between diffuser element and symbol face.

According to one embodiment, in step 671 of the provision, first the plastic layer is provided and then coated with the non-translucent coating. Subsequently, the at least one symbol face is exposed by removing part of the non-translucent coating. Then the intermediate component is applied on the non-translucent coating, for example, by means of an injection process.

According to one embodiment, in step 673 of the arrangement, an already formed diffuser element is inserted and attached in each light shaft. Alternatively, in step 673 of the arrangement, a material forming the diffuser element is applied on the symbol face of each light shaft, in order to form a diffuser element. The material can be applied by means of an injection process. For this purpose, a material combination of the material for the diffuser element and a material for the intermediate component is selected in such a way that the completed diffuser element does not adhere to the symbol face, which results in a gap between the diffuser element and the symbol face.

Figure 7:
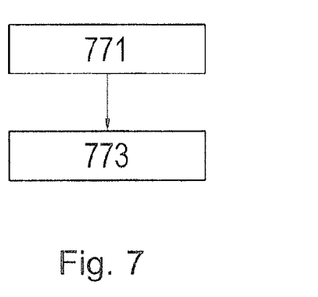
FIG. 7 a flow chart of a method for displaying a symbol.

FIG. 7 shows a flow chart of a method for displaying at least one symbol according to an embodiment of the present invention. For example, the method can be performed in connection with the described device.

For this purpose, in step 771, light is converted in diffuse light using a diffuser element and subsequently, in step 773, it is conducted through a gap on a symbol face for displaying the symbol. The symbol face can be designed in the form of a translucent surface inside a non-translucent surrounding region.

In step 771, a light color for the light can be set using the diffuser element in order to be able to display the symbol in the desired color.

Instead of step 771, light invading the diffuser element through the symbol face and the gap can be reflected back from the diffuser element through the gap and the symbol face, in order to display the symbol when the background illumination is turned off. At the same time, using the diffuser element, a light color of the light can be set in order to be able to display the symbol in the desired color.

The embodiments described and shown in the figures are selected merely for providing examples. Different embodiments can be combined with one another completely or with respect to specific features. It is also possible to supplement an embodiment with features of a different embodiment.

Furthermore, it is possible to repeat invention-based procedural steps and perform them in a sequence that differs from the one described.

If an embodiment comprises one "and/or" combination between a first characteristic and a second characteristic, this can be read in such a way that the embodiment comprises the first characteristic and the second characteristic according to one embodiment but, according to a further embodiment, it comprises only the first characteristic or only the second characteristic.

REFERENCE NUMERALS 100 device
102 vehicle
104 transmission
106 switching device
210 plastic layer
212 hard surface
214 non-translucent coating
216 symbol face
220 intermediate component
222 light shaft 224 diffuser element
226 gap
232 light
234 diffuse light
316 further symbol face
317 further symbol face
318 further symbol face
400 device
422 further light shaft
435 conductor board
441 color coat
443 further color coat
445 radiation pattern
447 further radiation pattern
451 illuminant
453 further illuminant
522 further light shaft
523 further light shaft
524 further diffuser element
526 further gap
561 radiation pattern
671 step of provision
673 step or arrangement
771 step of conversion
773 step of conducting

What is claimed is:

1. A method for producing a device for a vehicle for displaying at least one symbol, the method comprising:
providing an arrangement consisting of a translucent plastic layer with a non-translucent coating, wherein a symbol face for a symbol to be displayed by the device is recessed from the non-translucent coating, as well as a non-translucent intermediate component is arranged outside of the symbol face and surrounding the symbol face on the non-translucent coating and forms a light shaft adjoining the symbol face; and
arranging a diffuser element inside the light shaft and spaced apart by a gap from the symbol face, wherein the diffuser element is designed to convert light penetrating the diffuser element to diffuse light for illuminating the symbol face;
wherein the arranging the diffuser element comprises material for forming the diffuser element is sputtered on the symbol face in the light shaft, wherein the material has a characteristic which when curing the material results in a durable bond of the material on the intermediate component and when forming the gap to a decreasing bond on the symbol face.

2. A method for displaying at least one symbol, the method comprising:
converting light penetrating a diffuser element arranged in a light shaft to diffuse light, wherein the diffuser element comprises material for forming the diffuser element is sputtered on a symbol face in the light shaft, and wherein the material has a characteristic which when curing the material results in a durable bond of the material on an intermediate component and when forming a gap between the diffuser element and the symbol face to a decreasing bond on the symbol face; and
conducting the diffuse light through a gap on the symbol face, which is recessed from a non-translucent coating of a translucent plastic layer in order to display the symbol.

* * * * *